(12) United States Patent
Lin

(10) Patent No.: US 6,565,105 B2
(45) Date of Patent: May 20, 2003

(54) FRAME FOR AN ELECTRIC SCOOTER

(76) Inventor: Samuel Lin, 6, Kung Yeh 2 Rd. Tou Chiao Industrial Park, Min Hsiung Hsiang, Chia Yi Hsien (TW)

(\*) Notice: Subject to any disclaimer, the term of this patent is extended or adjusted under 35 U.S.C. 154(b) by 45 days.

(21) Appl. No.: 09/971,936

(22) Filed: Oct. 9, 2001

(65) Prior Publication Data

US 2003/0067151 A1 Apr. 10, 2003

(51) Int. Cl.[7] .................................................. B60G 7/04
(52) U.S. Cl. ........................ 280/124.113; 280/124.111; 280/124.177
(58) Field of Search ................................ 267/153, 141; 280/124.177, 124.111, 124.113, 755, 788, 124.11, 781; 180/208, 65.1, 311, 905, 908

(56) References Cited

U.S. PATENT DOCUMENTS

| 4,232,754 A | \* | 11/1980 | Corrigan et al. | 180/9.5 |
| 4,767,133 A | \* | 8/1988 | Yamada | 280/124.111 |
| 5,238,262 A | \* | 8/1993 | Nunes | 280/681 |
| 5,372,373 A | \* | 12/1994 | Reel | 280/124.111 |
| 5,871,218 A | \* | 2/1999 | Lepage et al. | 280/33.992 |
| 6,056,077 A | \* | 5/2000 | Kobayashi | 180/216 |

FOREIGN PATENT DOCUMENTS

JP    55102714 A  \* 8/1980

\* cited by examiner

Primary Examiner—Paul N. Dickson
Assistant Examiner—Ruth Ilan
(74) Attorney, Agent, or Firm—Rabin & Berdo, P.C.

(57) ABSTRACT

A frame for an electric scooter has a body, a pivotal bar, two wheel mounts, two resilient members and two tabs. The pivotal bar is pivotally attached to the front end of the body. Each wheel mount is pivotally attached to one end of the pivotal bar in a longitudinal direction. A front wheel is rotatably attached to each of the wheel mounts. The resilient members are attached to the top of the pivotal bar. The tabs are secured to the body and respectively abut one of the resilient members. Consequently, one of the resilient members will be compressed when one of the front wheels is bumped. This can keep the force applied to the front wheel from being transmitted to the body and the steering bar of the scooter. To steer and to drive the electric scooter become is easier.

13 Claims, 5 Drawing Sheets

FRAME FOR AN ELECTRIC SCOOTER

BACKGROUND OF THE INVENTION

1. Field of the Invention

The present invention relates to a frame, and more particularly to a frame with a shock-absorbing device for an electric scooter.

2. Description of Related Art

An electric scooter is used to help a person to move from place to place at a low speed. The conventional electric scooter substantially comprises a frame, two front wheels, two rear wheels, a seat, an electric motor and a steering bar. The front wheels are rotatably attached to the front end of the frame. The rear wheels are rotatably attached to the rear end of the frame. The seat is mounted on the frame for a user to sit. The electric motor is mounted on the frame to drive the rear wheels. The steering bar is pivotally mounted on the frame and is connected to the front wheels by a linking device, such that the direction in which the electric scooter travels is controlled by means of pivotally rotating the steering bar.

However, there is no shock-absorbing device for the front wheels of the conventional electric scooter. When one of the front wheels bumps an object, the force applied to the front wheel will be directly transmitted to the steering bar and frame. To steer the steering bar and to drive the electric scooter are uncomfortable.

To overcome the shortcomings, the present invention provides an improved frame to mitigate or obviate the aforementioned problems.

SUMMARY OF THE INVENTION

The main objective of the invention is to provide an improved frame for an electric scooter that makes steering and driving the electric scooter easier and keeps any force applied to the front wheel from being transmitted to the frame. The frame has a body, a pivotal bar, two wheel mounts, two resilient members and two tabs. The pivotal bar is pivotally attached to the front end of the body. Each wheel mount is pivotally attached to one end of the pivotal bar in a longitudinal direction. One of the front wheels is rotatably attached to each of the wheel mounts. The resilient members are attached to the top of the pivotal bar. The tabs are secured to the body and respectively abut one of the resilient members. With such an arrangement, one of the resilient members will be compressed to absorb the shock when one of the front wheels is bumped. To steer and to drive the electric scooter is easier.

Other objects, advantages and novel features of the invention will become more apparent from the following detailed description when taken in conjunction with the accompanying drawings.

DETAILED DESCRIPTION OF PREFERRED EMBODIMENT

Figure 1:
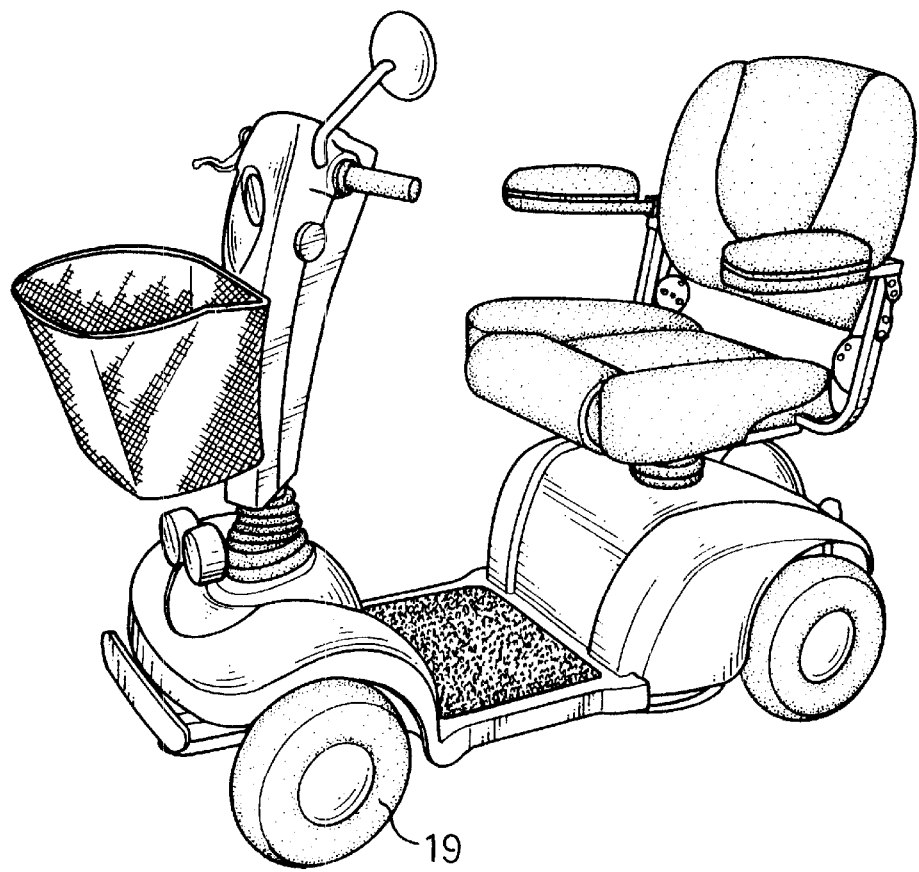
FIG. 1 is a perspective view of an electric scooter with a frame in accordance with the present invention.
Figure 2:
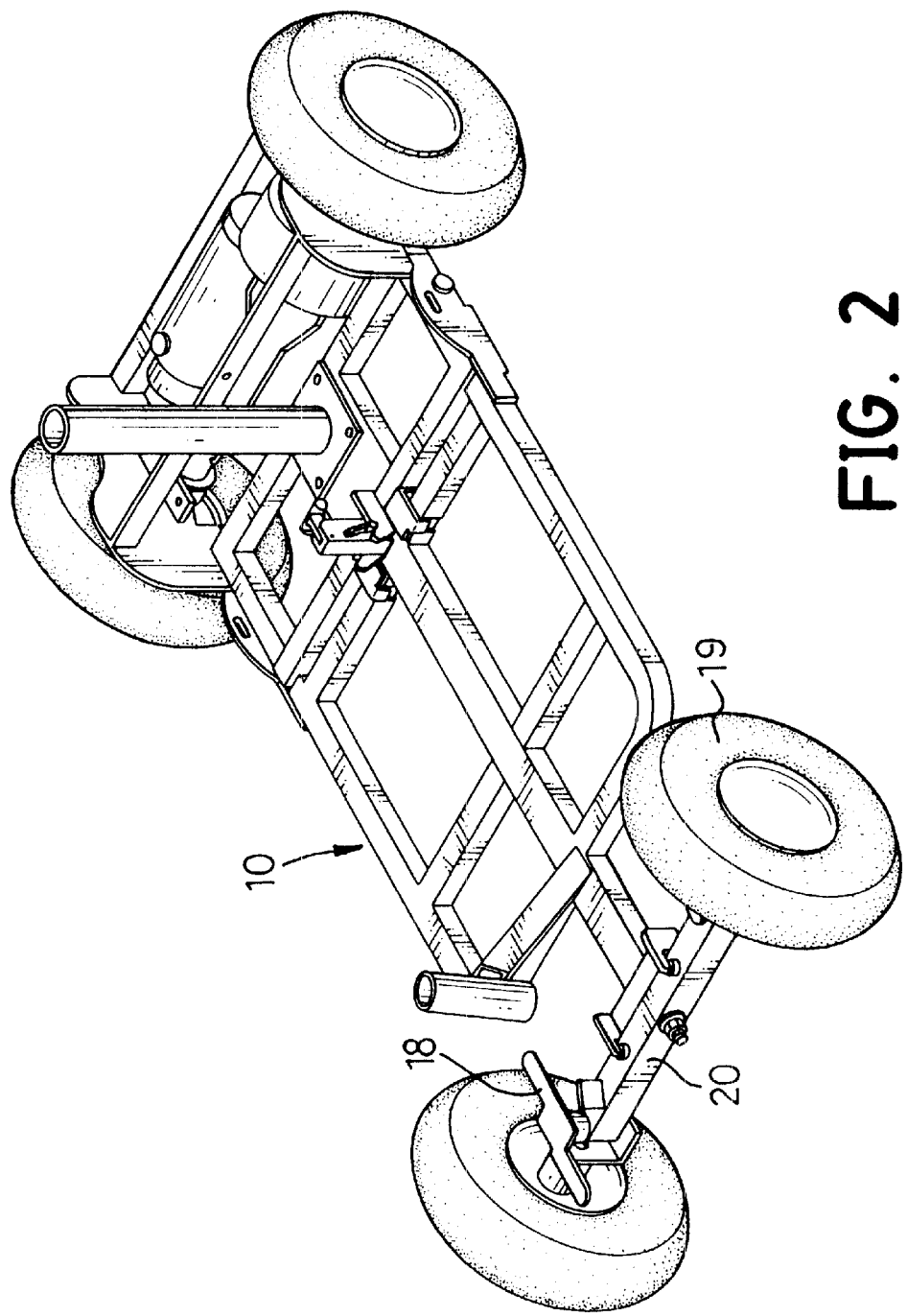
FIG. 2 is a perspective view of the frame in accordance with the present invention.
Figure 3:
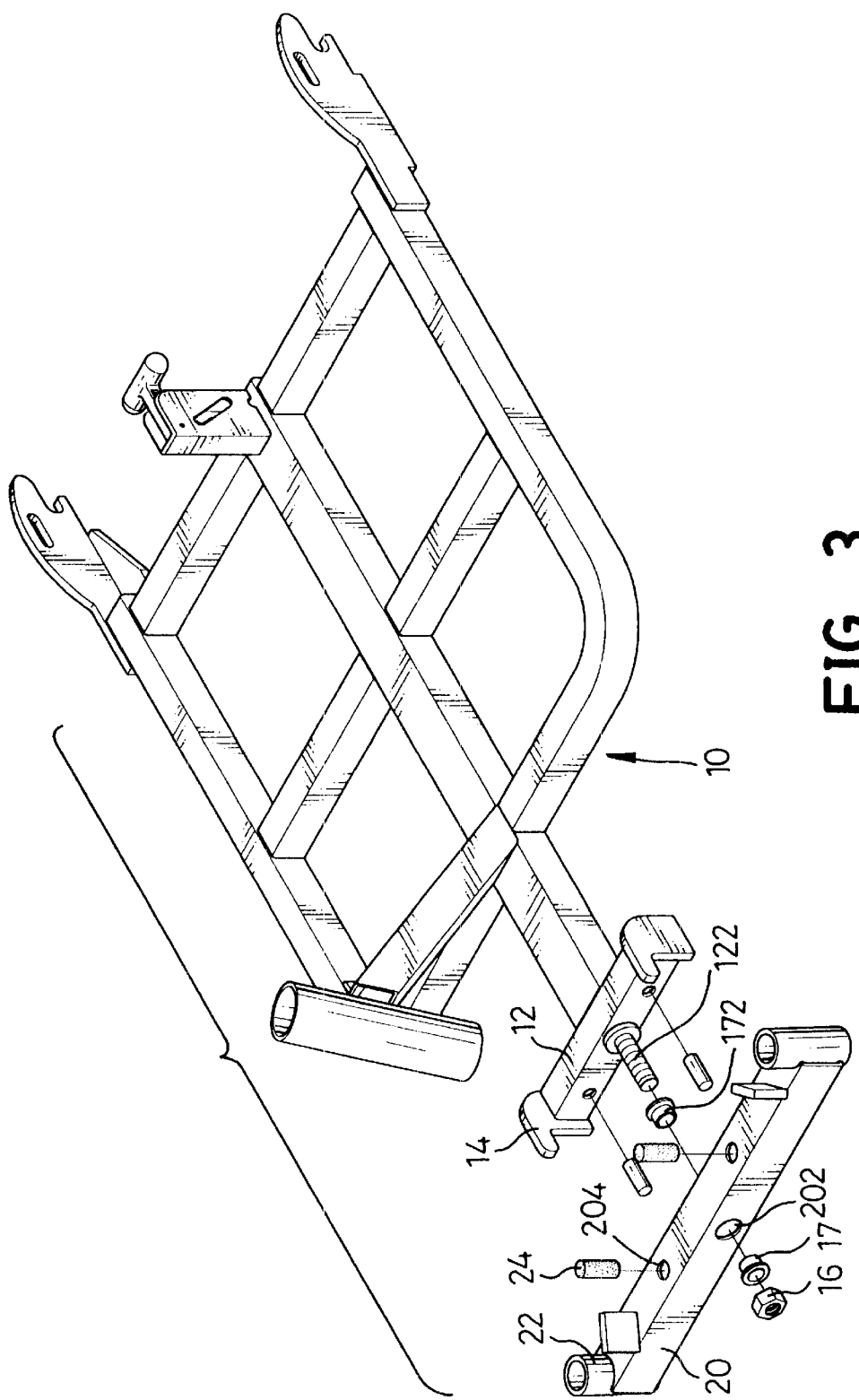
FIG. 3 is an exploded perspective view of the shock-absorbing device on the frame in FIG. 2.

With reference to FIGS. 1 to 3, a frame for an electric scooter in accordance with the present invention comprises a body (10), two tabs (14), a pivotal bar (20), two wheel mounts (18) and two resilient members (24). The body (10) has a lateral beam (12) with a middle and two ends. The middle of the lateral beam (12) is attached to the front end of the body (10). A pivot (122) with an outer thread is securely attached to the middle position of the lateral beam (12) and extends from the front of the lateral beam (12). The two tabs (14) are respectively secured to opposite ends of the lateral beam (12).

The pivotal bar (20) has a middle position and two ends and is pivotally attached to the lateral beam (12). A longitudinal through hole (202) is defined in the middle position of the pivotal bar (20) through which the pivot (122) extends. A nut (16) is screwed onto the pivot (122) and abuts the pivotal bar (20), such that the pivotal bar (20) is pivotally attached to the lateral beam (12) with the pivot (122) in cooperation with the nut (16). In addition, two bushings (17,172) are mounted in the through hole (202) in the pivotal bar (20) to reduce the friction between the pivot (122) and the inner surface of through hole (202) in the pivotal bar (20). The pivotal rotation of the pivotal bar (20) relative to the pivot (122) will be smoother.

A vertical tube (22) is mounted on each end of the pivotal bar (20). The two wheel mounts (18) are respectively pivotally attached to the vertical tubes (22) with a pivot pin (not shown). The front wheels (19) of the scooter are respectively rotatably attached to the wheel mounts (18). A linking device (not shown) is arranged between the steering bar (not shown) of the scooter and the wheel mounts (18). Consequently, the wheel mounts (18) with the front wheels (19) can be pivotally rotated relative to the frame by means of pivotally rotating the steering bar. The direction of travel of the electric scooter is controlled.

Two recesses (204) are defined in the top of the pivotal bar (20) and correspond to the tabs (14) on the lateral beam (12). Each resilient member (24) is mounted in one of the recesses (204) in the pivotal bar (20) and abuts the corresponding tab (14). Each resilient member (24) can be a cylindrical block of a resilient material like rubber or silicon. In another embodiment, each resilient member (24) can be a spring.

Figure 4:
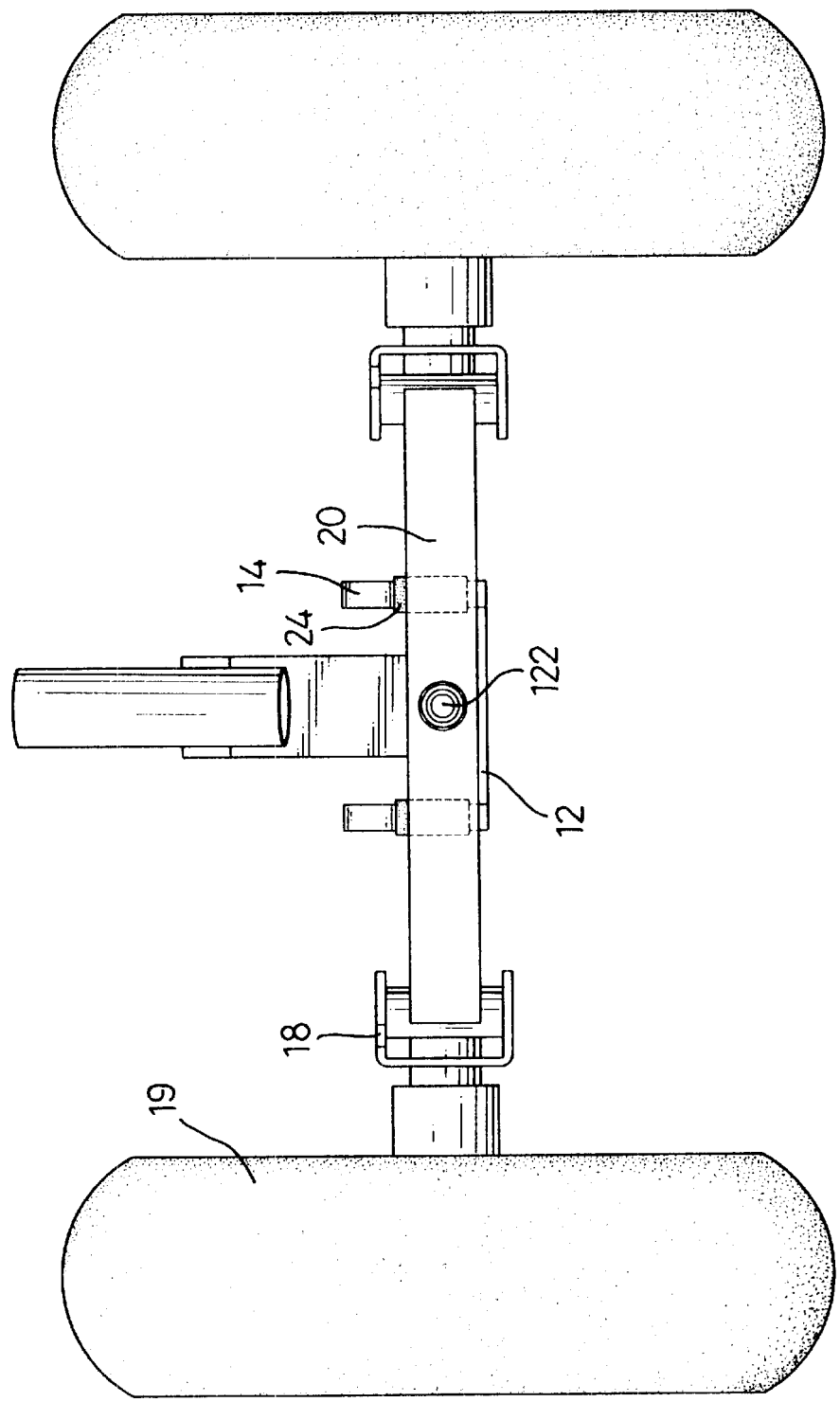
FIG. 4 is a front plan view of the frame in FIG. 2.
Figure 5:
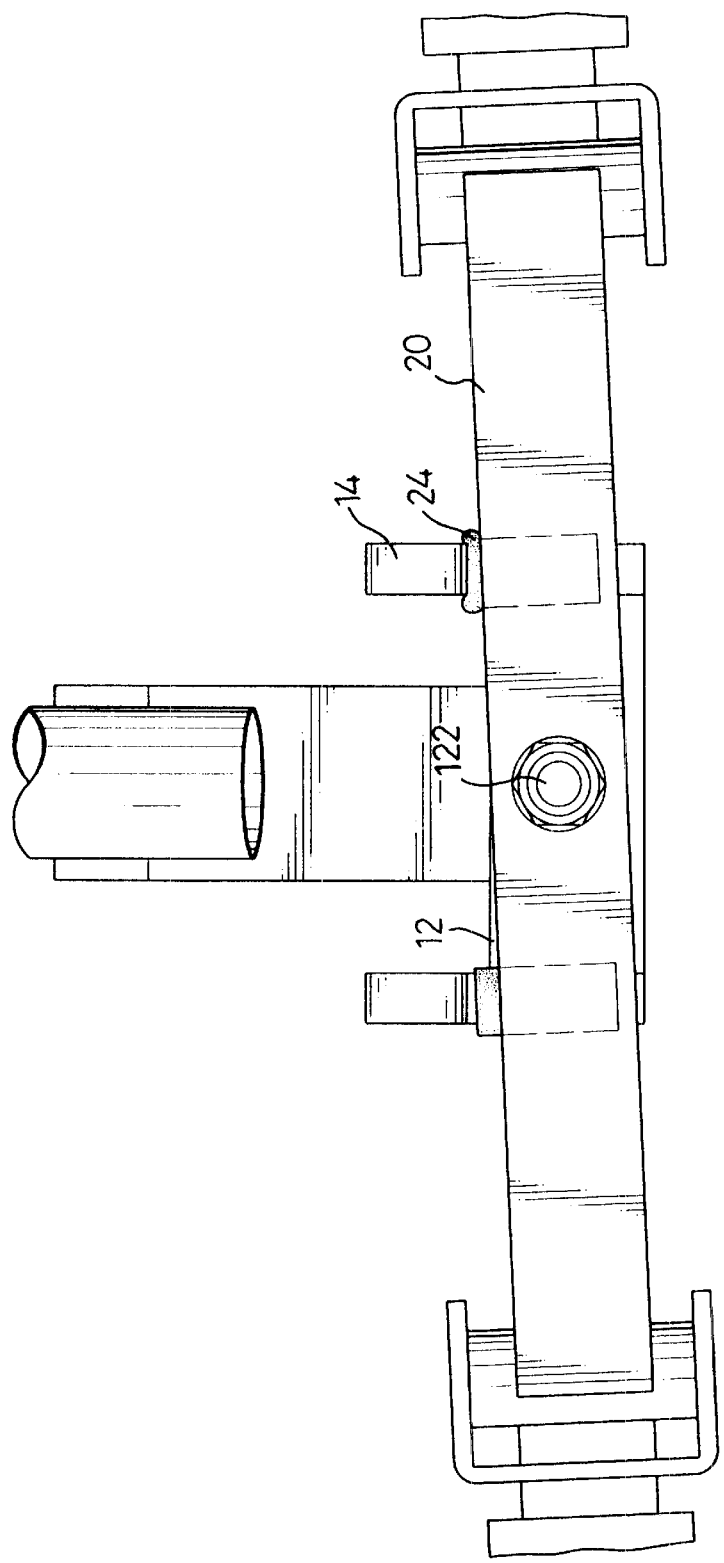
FIG. 5 is an operational front plan view of the frame in FIG. 4 showing the operation of the shock-absorbing device when one of the front wheels of the scooter is bumped by an object.

With reference to FIGS. 4 and 5, when one of the front wheels (19) of the electric scooter bumps an object, the pivotal bar (20) will pivotally rotate relative to the lateral bar (12) with the pivot (122) due to the force applied to the front wheel (19). The resilient member (24) near the bumped front wheel (19) will be compressed by the corresponding tab (14) to absorb the force applied to the bumped front wheel (19). This can keep the force from being transmitted to the body (10) or the steering bar of the scooter. To steer and to drive the scooter become is easier.

When the force applied to the front wheel (19) is released, the pivotal bar (20) will pivotally rotate to the original position relative to the body (10) by means of the restitution force provided by the resilient member (24).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A frame for an electric scooter having two front wheels, the frame comprising:

a body;

a pivotal bar pivotally attached to a front end of the body;

two wheel mounts respectively pivotally attached to opposite ends of the pivotal bar in a longitudinal direction and adapted for one of the front wheels to be rotatably attached to the wheel mount;

two resilient members attached to a top of the pivotal bar; and two tabs secured to the frame and respectively abutting one of the resilient members so as to push the abutting resilient member to absorb shock when one of the front wheels is bumped.

2. The frame as claimed in claim 1 further comprising a pivot with an outer thread securely attached to the front end of the body;

a longitudinal through hole defined in a middle position of the pivotal bar through which the pivot extends; and a nut screwed onto the pivot and abutting the pivotal bar so as to pivotally attach the pivotal bar to the body with the pivot in cooperation with the nut.

3. The frame as claimed in claim 2 further comprising at least one bushing mounted in the longitudinal through hole in the pivotal bar to reduce friction between the pivot and an inner surface of the through hole in the pivotal bar.

4. The frame as claimed in claim 2, wherein the body has a lateral beam integrally mounted on the front end of the body to pivotally attach the pivotal bar on the lateral beam.

5. The frame as claimed in claim 4, wherein the pivot is mounted on a middle position of the lateral beam.

6. The frame as claimed in claim 4, wherein the tabs are respectively secured to opposite ends of the lateral beam.

7. The frame as claimed in claim 1, wherein each resilient member is a block made of a resilient material.

8. The frame as claimed in claim 1, wherein each resilient member is a spring.

9. The frame as claimed in claim 1, wherein the pivotal bar has recesses defined in the top of the pivotal bar and corresponding to each tab on the body to hold each resilient member.

10. The frame as claimed in claim 9, wherein each resilient member is a block made of a resilient material.

11. The frame as claimed in claim 9, wherein each resilient member is a spring.

12. The frame as claimed in claim 1 further comprising a vertical tube mounted on each end of the pivotal bar for one of the wheel mounts to be pivotally attached to the tube with a pivot pin extending through the tube.

13. The frame as claimed in claim 1 further comprising a pivot with an outer thread securely attached to the front end of the body;

a through hole is defined in a middle position of the pivotal bar through which the pivot extends;

a nut screwed onto the pivot and abutting the pivotal bar so as to pivotally attach the pivotal bar to the body with the pivot, in cooperation with the nut;

at least one bushing mounted in the through hole in the pivotal bar to reduce friction between the pivot and an inner surface of through hole in the pivotal bar;

a lateral beam integrally mounted on the front end of the body to pivotally attach the pivotal bar on the lateral beam;

recesses defined in the top of the pivotal bar and corresponding to each tab on the body to receive each resilient member; and a vertical tube mounted on each end of the pivotal bar for one of the wheel mounts to be pivotally attached to the tube with a pivot extending through the tube, wherein the pivot is mounted on a middle position of the lateral beam; and the tabs are respectively secured to opposite ends of the lateral beam.

* * * * *